Figure 1:
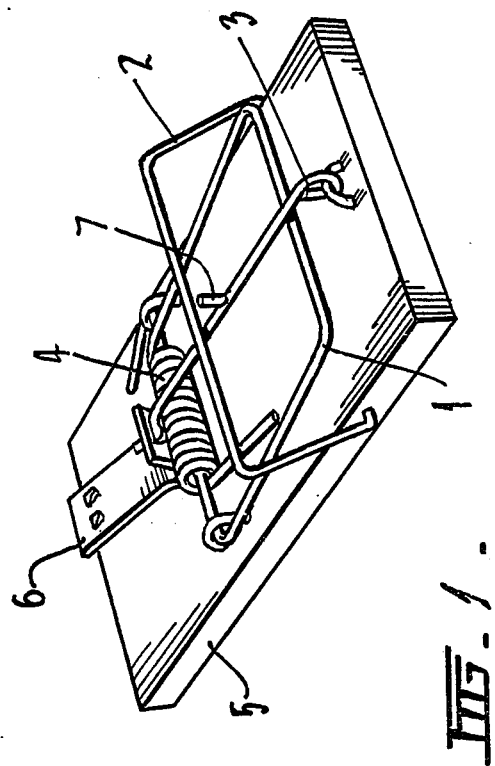
Figure 2:
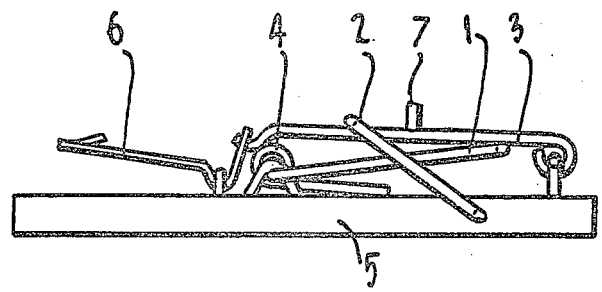
Figure 3:
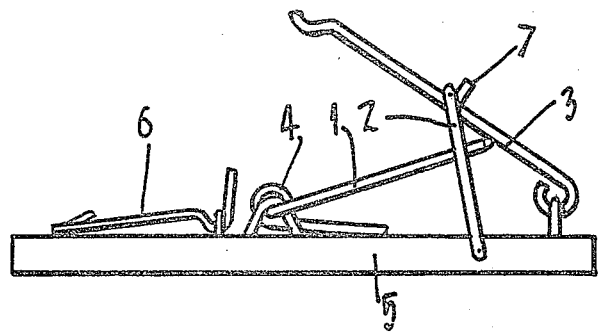
Figure 4:
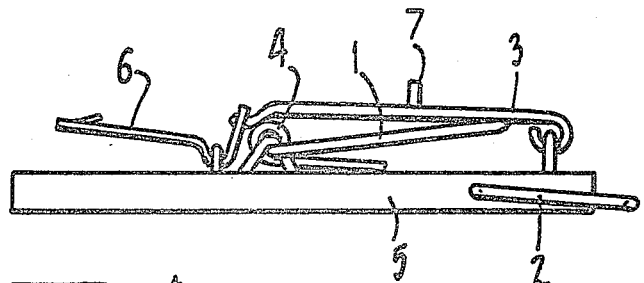

United States Patent [19]

Dickinson

[11] Patent Number: 4,481,730

[45] Date of Patent: Nov. 13, 1984

[54] SPRING OPERATED ANIMAL TRAPS

[76] Inventor: Jack G. J. Dickinson, 4 Weymar St., Cheltenham 3192 Melbourne, Victoria, Australia

[21] Appl. No.: 345,218

[22] Filed: Feb. 3, 1982

[51] Int. Cl.³ ............................................. A01M 23/30
[52] U.S. Cl. .......................................... 43/81.5; 43/81
[58] Field of Search ....................... 43/81.5, 82, 83, 81

[56] References Cited

U.S. PATENT DOCUMENTS

| | | | |
|---|---|---|---|
| 1,441,523 | 1/1923 | Pittman | 43/81.5 |
| 2,094,686 | 10/1937 | Stilson | 43/81.5 |
| 3,392,478 | 7/1968 | Strayline | 43/81.5 |
| 3,823,505 | 7/1974 | Holt | 43/81.5 |

FOREIGN PATENT DOCUMENTS

| | | | |
|---|---|---|---|
| 498190 | 1/1937 | United Kingdom | 43/81.5 |
| 465991 | 5/1937 | United Kingdom | 43/82 |

Primary Examiner—Nicholas P. Godici
Assistant Examiner—Kurt Rowan

[57] ABSTRACT

A spring operated animal trap in which the bail is held against spring tension by a catch arm engaging a trip member, the catch arm having a step or notch which engages a rotatable loop to hold the trap in the "set" position. The loop can then be manually rotated out of the way of the catch arm and the bail.

1 Claim, 4 Drawing Figures

SPRING OPERATED ANIMAL TRAPS

This invention relates to spring operated animal traps, e.g. rat traps, in which a bail is propelled on to the animal by a spring in response to the release of a latch, difficulty is experienced in setting such traps, as the latch must, for effectiveness, be released on light pressure.

It is the principal object of the present invention to provide a spring operated trap which is easier to set than the conventional traps.

In order to achieve this principal object, the present invention provides a trap comprising a spring urged bail, a latch which can release the bail when the spring is tensioned, and a manually releasable retaining member which can engage the bail when the spring is tensioned.

One practical arrangement of a rat trap according to the present invention is illustrated by the accompanying perspective drawing. The rat trap comprises a block of wood on the surface of which is pivoted a bail which is rotated through 180° from a set position to a rat striking position by a helical spring in the conventional manner, the bail is held in the spring tensioning position by a conventional catch arm (C) engaging in a conventional latch (F) which can be released by light pressure on one end of a trip member (F). The catch arm (C) has a step formed in it, into which a loop (A) may be engaged, the loop extending across the block (E) and pivoted at the sides of the block.

In operation the bail (B) is moved to the spring tensioning position, the catch arm (C) and latch (F) are engaged to hold the bail (B) in the set position in the conventional manner, and the loop (A) is rotated to engage in the step (G).

The trap can then be safely carried to the position of use, whereupon the loop (A) is rotated clear of the catch arm (C) to leave the trap ready to spring upon release of the latch (F). If it is desired to unset the trap, the loop (A) is again rotated into engagement with the step (G), the latch (F) is released, and the bail (B) is allowed to rotate under the action of the spring (D) in a controlled manner. The claims defining the invention are as follows:

I claim:

1. I claim a trap comprising a base, a spring urged bail pivoted to the base, a releasable catch arm pivoted to the base and adapted to engage a trip member mounted on the base and to thereby retain the bail against the tension of the spring, said catch arm having a step or notch formed therein, and a manually rotatable loop pivoted on the base and extended across the bail to engage the step or notch when the catch arm is in position to retain the bail against the tension of the spring.

* * * * *